US009903501B2

United States Patent
Huo et al.

(10) Patent No.: US 9,903,501 B2
(45) Date of Patent: Feb. 27, 2018

(54) VALVE ASSEMBLY

(71) Applicant: EMERSON PROCESS MANAGEMENT REGULATOR TECHNOLOGIES, INC., McKinney, TX (US)

(72) Inventors: Yuxiong Huo, Chengdu (CN); Yanwei Lei, Chengdu (CN); Xiaojuan Qin, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/437,829

(22) PCT Filed: Oct. 22, 2013

(86) PCT No.: PCT/CN2013/085720
§ 371 (c)(1),
(2) Date: Apr. 22, 2015

(87) PCT Pub. No.: WO2014/063619
PCT Pub. Date: May 1, 2014

(65) Prior Publication Data
US 2015/0300523 A1    Oct. 22, 2015

(30) Foreign Application Priority Data

Oct. 22, 2012   (CN) .......................... 2012 2 0565941

(51) Int. Cl.
*F16K 31/126*   (2006.01)
*F16K 31/122*   (2006.01)
(Continued)

(52) U.S. Cl.
CPC .......... *F16K 31/1221* (2013.01); *F16K 3/246* (2013.01); *F16K 31/1264* (2013.01); *G05D 16/0655* (2013.01)

(58) Field of Classification Search
CPC .. F16K 31/1221; F16K 31/1264; F16K 3/246; Y10T 137/7762; Y10T 137/7767;
(Continued)

(56) References Cited

U.S. PATENT DOCUMENTS 2,664,674 A * 1/1954 Niesemann ........ G05D 16/0663
137/116.5
2,787,126 A * 4/1957 Kleczek ................ F16K 31/122
137/242
(Continued)

FOREIGN PATENT DOCUMENTS

| CN | 1748103 A | 3/2006 |
|---|---|---|
| CN | 102691816 A | 9/2012 |

OTHER PUBLICATIONS

International Preliminary Report on Patentability and Written Opinion from International Application No. PCT/CN2013/085720, dated May 7, 2015.
(Continued)

*Primary Examiner* — Minh Le
(74) *Attorney, Agent, or Firm* — Marshall, Gerstein & Borun LLP

(57) ABSTRACT

A valve assembly includes a sensing device, a main spring, a bonnet located below the sensing device, a piston with a through hole, and a valve stem connected with the sensing device and having a penetrating part through the through hole. The sensing device drives the valve stem to drive the piston. The valve assembly also includes an auxiliary spring arranged between the bonnet and the piston. The penetrating part is longer than the depth of the through hole and the valve stem is slidably coupled in piston. The valve assembly
(Continued)

can prevent the valve stem from transferring the force of the main spring to the piston, so as to avoid damaging the valve port, the valve stem, and the piston when the force of the main spring is too large.

20 Claims, 3 Drawing Sheets

(51) Int. Cl.
*F16K 3/24* (2006.01)
*G05D 16/06* (2006.01)

(58) Field of Classification Search
CPC ........... Y10T 137/7769; Y10T 137/777; Y10T 137/7772; Y10T 137/7773; Y10T 137/7804; Y10T 137/7815
USPC ... 137/488, 492, 489.3, 492.5, 493.1, 493.2, 137/505.21, 116.3, 315.35
See application file for complete search history.

(56) References Cited

U.S. PATENT DOCUMENTS

| | | | | |
|---|---|---|---|---|
| 2,974,679 A * | 3/1961 | Heller | ............... | F16K 31/145 137/489.3 |
| 3,495,619 A * | 2/1970 | Iizumi Tomomitsu | . | F16K 31/36 137/116.5 |
| 3,756,264 A * | 9/1973 | Fisher | ............... | G05D 16/0666 137/116.3 |
| 4,291,612 A * | 9/1981 | Day | ............... | B60T 13/52 137/115.14 |
| 5,027,852 A * | 7/1991 | McNeely | ............... | G05D 16/18 137/488 |
| 5,183,074 A * | 2/1993 | Reese | ............... | F02M 37/0029 137/488 |
| 6,079,434 A * | 6/2000 | Reid | ............... | G05D 16/0655 137/14 |
| 6,349,920 B1 * | 2/2002 | Lewis | ............... | F16K 1/52 137/625.69 |
| 6,371,156 B1 * | 4/2002 | Walton | ............... | G05D 16/166 137/106 |
| 8,356,622 B2 * | 1/2013 | Wears | ............... | F16K 3/246 137/454.6 |
| 8,752,807 B2 * | 6/2014 | Nomichi | ............... | F16K 1/42 251/174 |
| 8,869,827 B2 * | 10/2014 | Yamauchi | ............... | G05D 16/0669 137/505.13 |
| 2011/0284102 A1 * | 11/2011 | Schneider | ............... | F16K 1/487 137/505.47 |
| 2012/0241662 A1 | 9/2012 | Clifford et al. | | |
| 2013/0320252 A1 * | 12/2013 | Hageman | ............... | F16K 3/246 251/324 |

OTHER PUBLICATIONS

First Office Action received for Chinese Application No. 201210424698.0, dated Mar. 22, 2017.

* cited by examiner

VALVE ASSEMBLY

TECHNICAL FIELD

The present invention relates to a valve assembly.

BACKGROUND ART

Valve assemblies play a very important role in the automatic control of modernized factories. Factory production depends on the correct distribution and control of flowing medium. Regardless of energy exchange, pressure decrease or simple container charging, the control needs to be completed by final control elements, and especially, valve assemblies are the most commonly used type of the final control elements. Valve assemblies which are used for adjusting pressure parameters adjust the set values of the pressure by changing the compression amounts of the springs via valves to stabilize the pressure of fluid within the needed pressure range. As shown in FIG. 1, the working principle is that a signal pipe 101 needs to be connected to a pressure tapping point to be sensed and controlled, an actuator 102 is enabled to sense the pressure of the pressure tapping point, and when the force produced when the pressure of the pressure tapping point acts on the lower part of a diaphragm 105 is larger than the force of a main spring 106, the diaphragm 105 moves upwards to drive a valve stem 107 and a piston 108 to move upwards and the piston 108 leaves a valve port to realize a pressure regulator opening action. When the pressure of the pressure tapping point is smaller than the force of the main spring, the piston moves downwards to be in contact with the valve port 109 to realize the goal of closing, wherein the closing force is fully provided by the main spring 106.

During the realization of the present invention, the inventor finds that the prior art at least has the following problems: when the force of the main spring is too large, although a lower limiting block 110 limits the downward stroke of the valve stem 107, due to accumulation of various errors, the limiting block 110 cannot play a very good limiting role. The force of the main spring is still transferred to and concentrated on a valve core assembly (valve stem 107, piston 108 and valve port 109). For this reason, the valve core assembly can be damaged, the valve may not to work normally and unnecessary losses are caused.

BRIEF SUMMARY

The present invention provides a valve assembly to solve the above-mentioned technical problem.

In accordance with a first exemplary aspect of the present invention, a valve assembly includes a sensing device, a piston with a center through hole, and a valve stem. An upper end of the valve stem is connected with the sensing device, and a lower end of the valve stem is provided with a penetrating part which penetrates through the center through hole so as to enable the valve stem to be connected with the piston. The sensing device drives the valve stem to drive the piston to move up and down. An auxiliary spring which is always in a compressed state is arranged on the piston. The length of the penetrating part is greater than the depth of the center through hole, and the valve stem is slidably coupled in the center through hole of the piston.

In one preferred form, the valve stem further includes a main body part which is connected with the penetrating part, and an axial clearance exists between the main body part and the piston.

In another preferred form, the connection between the main body part and the penetrating part is a stepped structure.

In another preferred form, the valve stem further includes a main body part which is connected with the penetrating part, and the outer diameter of the main body part is equal to the outer diameter of the penetrating part.

In another preferred form, a main spring is arranged above the sensing device, and the force of the main spring is transferred to the valve stem through the sensing device.

In another preferred form, the valve assembly further includes a limiting block which is used for limiting the stroke of the valve stem to keep the axial clearance.

In another preferred form, the sensing device is a sensing chamber including a sensing element and a shell, wherein the valve stem penetrates through the sensing element and the sensing element drives the valve stem to move up and down.

The valve assembly according to the present invention has the advantages that since the auxiliary spring, which is in a compressed state, is arranged between the bonnet and the piston, the length of the penetrating part is larger than the depth of the center through hole, such that when the force of the main spring is too large, the diaphragm drives the valve stem to move downwards; since the valve stem is slidably coupled in the center through hole of the piston, the penetrating part and the piston move relative to one another and the force of the main spring to the valve stem cannot be transferred to the piston; and in addition, since the auxiliary spring is always in a compressed state, the auxiliary spring always applies a downward acting force to the piston, such that the auxiliary spring not only provides the closing force, but the axial clearance is always kept between the main body part of the valve stem and the piston to protect the valve core assembly from being damaged.

In accordance with a second exemplary aspect of the present invention, a valve stem includes a main body part which is connected with a piston and an axial clearance exists between the main body part and the piston. When the force of the main spring acts on the valve stem, because the axial clearance exists between the main body part and the piston, the force of the main spring cannot provide a closing force for the valve port. Since the auxiliary spring is always in a compressed state and always applies a downward acting force to the piston, the auxiliary spring not only provides the closing force but serves to maintain the axial clearance between the valve stem and the piston. Therefore, the piston is only subjected to the closing force provided by the auxiliary spring, and because the closing force is far smaller than the force of the main spring, this protects the valve core assembly from being damaged.

In accordance with a third exemplary aspect of the present invention a valve stem includes a main body part having an outer diameter equal to an outer diameter of a penetrating part, such that the piston can freely move up and down relative to the valve stem; and in addition, because the outer diameter of the main body part is equal to the outer diameter of the penetrating part, the valve stem has a uniform outer diameter, which can be produced easily and at a lower manufacturing cost.

DETAILED DESCRIPTION OF THE DRAWINGS

The technical solution of the present invention is further described below in combination with the drawings and the embodiments. The description of the preferred embodiments below is just exemplary and is absolutely not limited to the present invention and the application or using method thereof.

Example I

Figure 1:
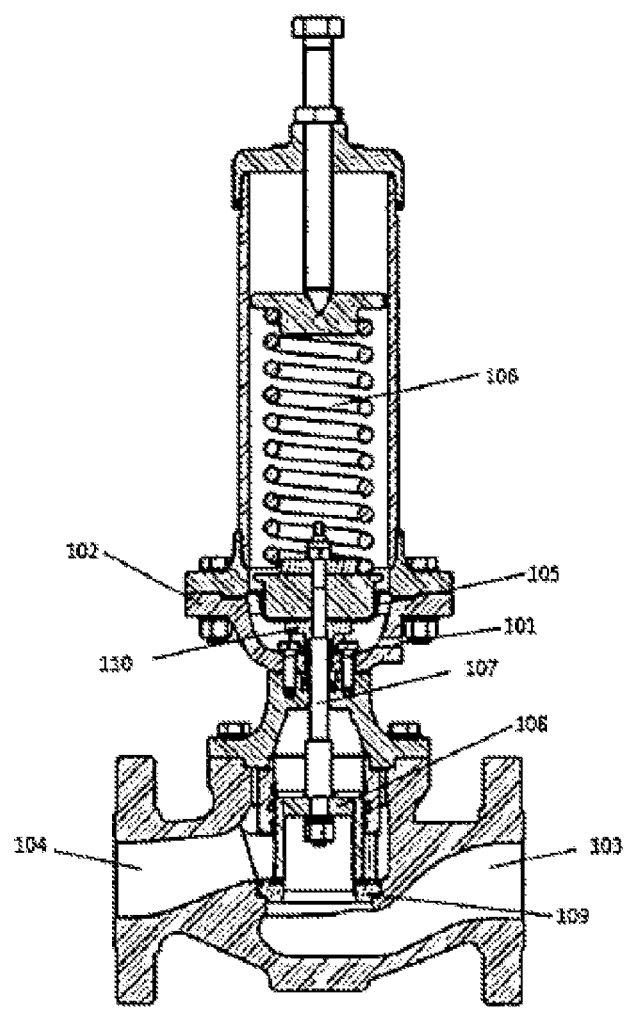
FIG. 1 is a cross-sectional view of a valve assembly in the prior art.
Figure 2:
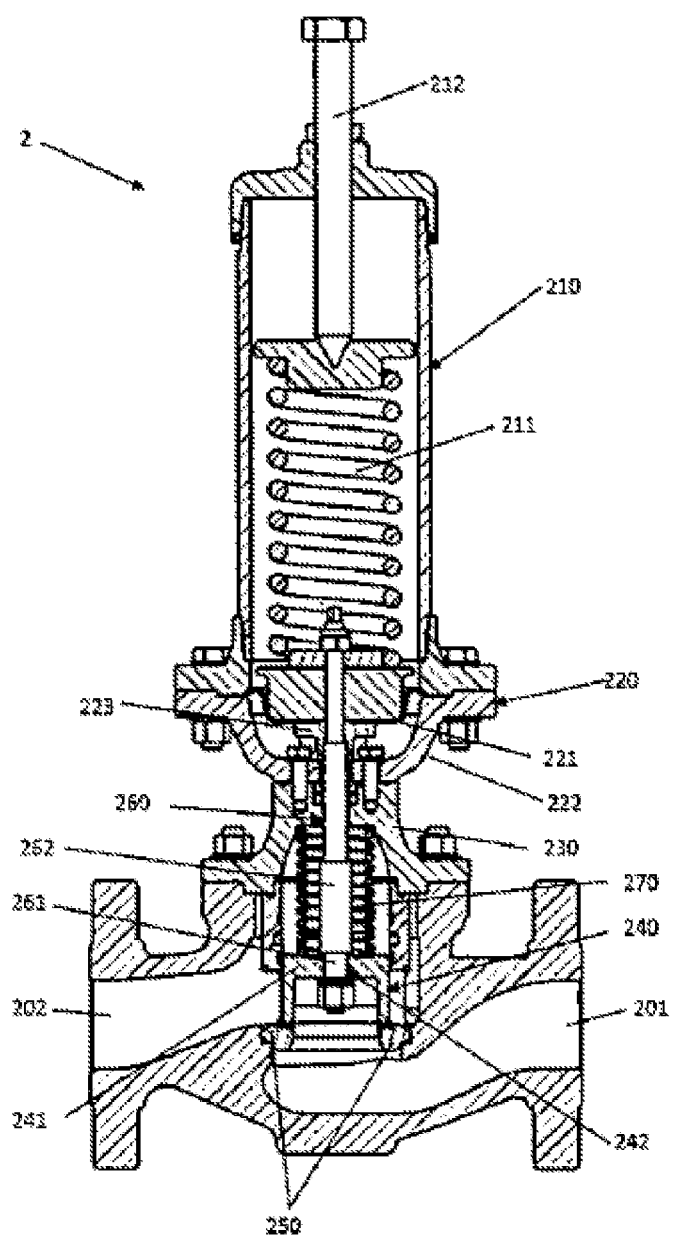
FIG. 2 is a cross-sectional view of a valve assembly constructed in accordance with a first example of the present invention.

As shown in FIG. 2, a valve assembly 2 constructed in accordance with the teachings of the present invention includes a spring housing 210, a sensing device 220 which is located below the spring housing 210, and a bonnet 230, a piston 240 and a valve port 250 which are sequentially located below the sensing device 220. The valve assembly 2 further includes a valve stem 260 which penetrates through the sensing device 220, the bonnet 230 and the piston 240, wherein a main spring 211 and an adjusting screw rod 212 are arranged in the spring housing 210, one end of the adjusting screw rod 212 is connected with the main spring 211, and the other end of the adjusting screw rod 212 extends outside of the spring housing 210. The sensing device 220 is a sensing chamber consisting of a diaphragm 221 and a shell 222 thereof. The bonnet 230 is connected below the shell 222 of the sensing device. An auxiliary spring 270 is arranged between the bonnet 230 and the piston 240 below the bonnet 230. The auxiliary spring 270 is always in a compressed state and respectively applies upward acting force and downward acting force to the bonnet 230 and the piston 240. A baffle 241 is arranged on the piston 240 and the baffle 241 is provided with a center through hole 242 penetrated by the valve stem 260. One end of the valve stem 260 is connected with the baffle 241 and the other end of the valve stem 260 is connected with the sensing device 220.

Figure 3:
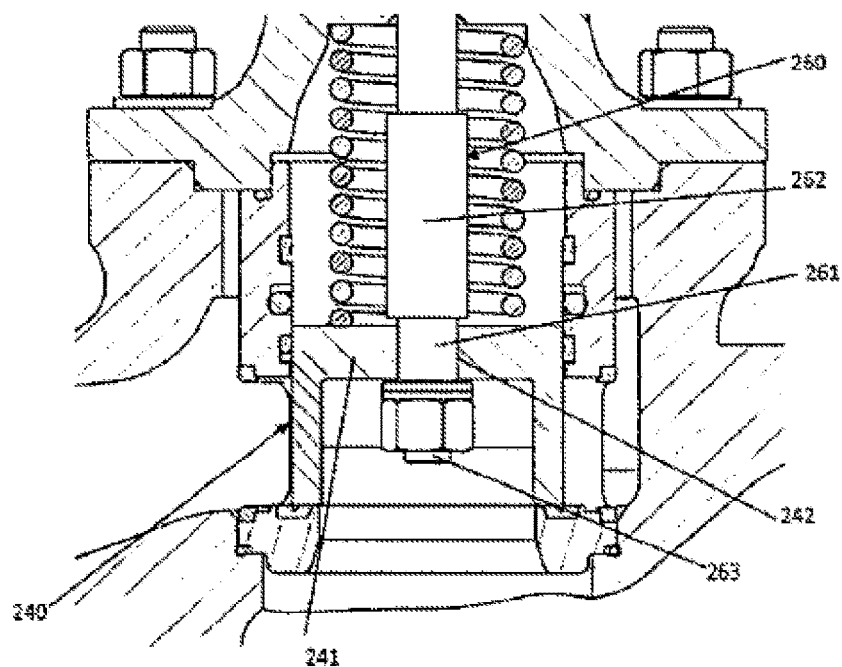
FIG. 3 is a close-up view of a portion of the valve assembly of FIG. 2.

FIG. 3 is a close-up view of the valve stem 260 provided by the first example of the present invention. The valve stem 260 includes a penetrating part 261 which is located in the center through hole 242, a main body part 262 which is connected above the penetrating part 261, and an end part 263 which is located below the baffle 241, wherein the end part 263 connects the valve stem 260 with the piston 240 through a nut. The penetrating part 261 is the part that penetrates through the center through hole 242, of the valve stem 260. The length of the penetrating part 261 is larger than the depth of the center through hole 242 and the penetrating part 261 is in clearance fit with the center through hole 242, so that the penetrating part 261 can slide up and down in the center through hole 242, i.e., the penetrating part 261 and the center through hole 242 can produce relative displacement during movement. The outer diameter of the main body part 262 is larger than the inner diameter of the center through hole 242, so as to prevent the main body part 262 from penetrating through the center through hole 242. Since the length of the penetrating part 261 is larger than the depth of the center through hole 242, an axial clearance exists between the main body part 262 and the baffle 241.

As shown in FIG. 2, by rotating the adjusting screw rod 212, the main spring 211 is compressed or extended accordingly and has certain spring force which acts on the sensing device 220. Fluid flows into the valve assembly 2 from an inlet 201, and the sensing device 220 senses the pressure of the fluid at a pressure tapping point. When the force produced when the fluid acts on the lower part of the diaphragm 221 is larger than the force of the main spring 211, the diaphragm 221 moves upwards to drive the valve stem 260 to move upwards, thereby driving the piston 240 to move upwards far away from the valve port 250 to realize the opening action of the valve port 250.

When the force produced when the fluid acts on the lower part of the diaphragm 221 is smaller than the force of the main spring 211, the diaphragm 221 moves downwards to drive the valve stem 260 to move downwards. The piston 240 moves downwards with the valve stem 260. Since the auxiliary spring 270 is always in a compressed state between the bonnet 230 and the baffle 241, the auxiliary spring 270 applies a downward acting force to the baffle 241 and the axial clearance is always kept between the main body part 262 and the baffle 241. When the piston 240 continuously moves downwards and is in contact with the valve port 250, the valve stem 260 continuously moves downwards. At this moment, since the axial clearance exists between the main body part 262 and the baffle 241, and the penetrating part 261 is in clearance fit with the center through hole 242, the penetrating part 261 moves relative to the baffle 241 in the center through hole 242, i.e., the valve stem 260 continuously moves downwards relative to the baffle 241. The spring force transferred by the main spring 211 to the valve stem 260 cannot be transferred to the piston 240. However, the auxiliary spring 270 applies downward acting force to the piston 240, so that the piston 240 can continuously move downwards until the valve port 250 is fully closed. In this process, the piston 240 is only subjected to the acting force of the auxiliary spring 270 and is not subjected to the spring force transferred by the main spring 211 to the valve stem 260. Relative to the force of the main spring 211, the acting force produced by the auxiliary spring 270 is smaller. Thus, when the force of the main spring 211 is too large, the valve port 250, the valve stem 260 and the piston 240 are not damaged by the piston 240 due to too large of a force.

The valve assembly 2 further includes a limiting block 223 which is located in the sensing device 220. The limiting block 223 is fixed on the inner surface of the shell 222 and is located below the diaphragm 221. The diaphragm 221 drives the valve stem 260 to move downwards and the limiting block 223 also moves downwards. When the limiting block 223 is in contact with the inner surface of the shell 222 below the limiting block 223, the shell 222 stops the diaphragm 221 and the valve stem 260 from continuously moving downwards. The limiting block 223 prevents the downward stroke from being too large due to too large of a force applied to the valve stem 260, which facilitates the relative movement of the valve stem 260 and the piston 240, but guarantees that the relative displacement between the valve stem 260 and the piston 240 is within an effective range, so as to avoid damaging the parts.

When the valve assembly 2 is in a working state, the direction of the acting force transferred by the main spring 211 to the valve stem 260 and the direction of the acting force applied by the auxiliary spring 270 to the piston 240 are always kept to be consistent and downward. The two springs jointly act on the movement of the valve stem 260 and the piston 240. Compared with the case that the auxiliary spring 270 is not utilized, the main spring 211 can use small elastic force to achieve the same effect, so that the working accuracy and stability of the valve assembly 2 are higher.

Example II

Figure 4:
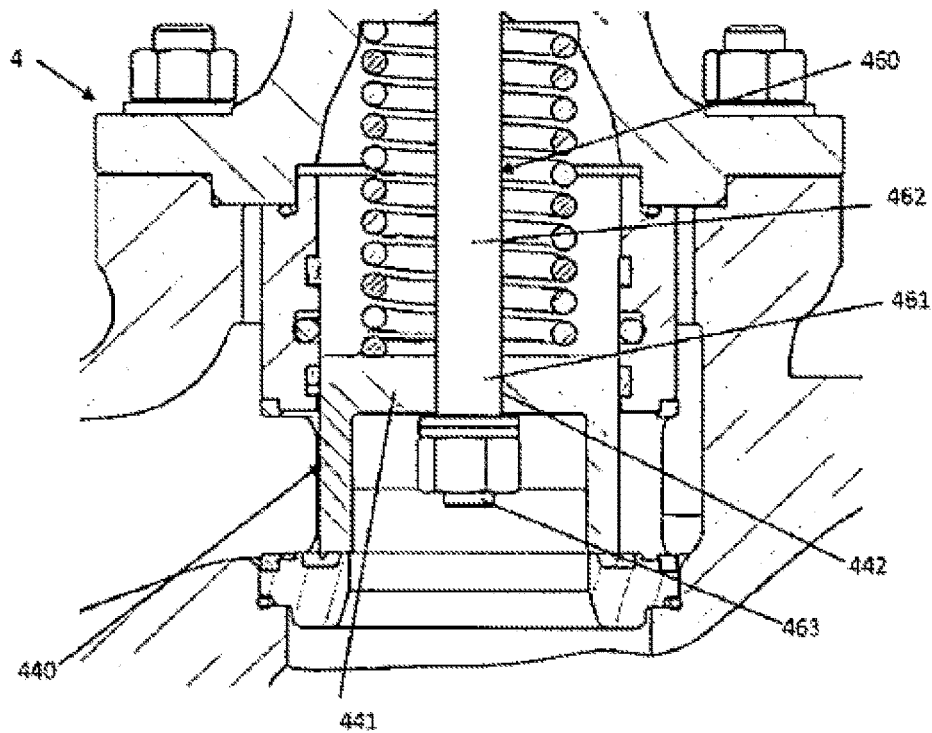
FIG. 4 is a close-up, cross-sectional view of a portion of a valve assembly constructed in accordance with a second example of the present invention.

FIG. 4 depicts another example of a valve stem of a valve assembly 4 constructed in accordance with the teachings of the present invention. The valve assembly 4 includes a valve stem 460, which comprises a penetrating part 461 which is located in the center through hole 442, a main body part 462 which is connected above the penetrating part 461, and an end part 463 which is located below the baffle 441, wherein the end part 463 connects the valve stem 460 with the piston 440 through a nut. The penetrating part 461 is the part, which penetrates through the center through hole 442, of the valve stem 460. The penetrating part 461 is in clearance fit with the center through hole 442, so that the penetrating part 461 can slide up and down in the center through hole 442, i.e., the penetrating part 261 and the center through hole 242 are displaced relative to one another during movement. The outer diameter of the main body part 262 is equal to the outer diameter of the penetrating part 442, i.e., the penetrating part and the main body part are respectively a rod object with uniform thickness. The piston 240 can freely slide up and down relative to the valve stem 260. The range of the relative displacement between the valve stem 260 and the piston 240 is larger, and is more easily produced at a lower production cost.

Other structures except the valve stem of the valve assembly 4 provided by this example are identical with that of the valve assembly 2 provided by the first example, and thus are not repetitively described here.

The exemplary examples provided by the present invention are intended to enable the present disclosure to be more complete and to comprehensively convey the protection scope thereof to one skilled in the art. Examples of a great number of details such as specific parts, devices and methods are described so as to provide comprehensive understanding to the examples of the present disclosure. It is very obvious for one skilled in the art that the details are unnecessarily provided, the exemplary examples can be implemented in various different forms and they shall not be explained as limitations to the scope of the present disclosure. In some exemplary examples, well-known processes, well-known device structures and well-known techniques are not described in detail.

Although terms such as first, second and third can be used to describe various components, parts or portions, these components, parts or portions shall not be limited by these terms; and these terms are only used for distinguishing a component, part or portion. When numerical value terms such as "first" and "second" are used herein, they do not contain sequences or orders, unless otherwise clearly stated in the context. Therefore, under the situation of not departing from the description of the exemplary examples, the first component, part or portion described below can be explained as the term of a first component, part or portion.

Although various embodiments of the present invention have been described herein in detail, it should be understood that the present invention is not limited to the embodiments which are described and shown herein in detail. Other transformations and modifications can be realized by one skilled in the art under the situation of not departing from the essence and the scope of the present invention. All such transformations and modifications shall fall into the scope of the present invention. In addition, all components described herein can be replaced by other technically equivalent components.

The invention claimed is:

1. A valve assembly, comprising:
   a sensing device comprising a shell and a sensing element, the shell defining a sensing chamber, the sensing element arranged in the sensing chamber;
   a bonnet coupled to the shell;
   a valve body defining an inlet and an outlet, the bonnet coupled to and partially disposed within the valve body;
   a piston movably disposed within the valve body, the piston having a center through hole;
   a cylindrical sleeve having an inner surface arranged to sealingly engage the piston, the bonnet seated against a portion of the cylindrical sleeve;
   a valve stem having an upper end connected with the sensing element and a lower end provided with a penetrating part which penetrates through the center through hole so as to enable the valve stem to be connected with the piston, wherein the sensing element drives the valve stem to drive the piston to move up and down; and
   an auxiliary spring having one end seated against the bonnet and another end seated against the piston, wherein the auxiliary spring is always in a compressed state,
   wherein the length of the penetrating part is greater than the depth of the center through hole, and wherein the valve stem is slidably coupled in the center through hole of the piston, and
   wherein the valve body defines a first shoulder and the cylindrical sleeve defines a second shoulder, the bonnet has an annular protrusion that extends into the valve body, and the annular protrusion has an outer radial surface that engages the valve body, an inner radial surface that engages the cylindrical sleeve, and an end surface extending between the outer and inner radial surfaces and seated against both of the first and second shoulders.

2. The valve assembly according to claim 1, wherein the valve stem further comprises a main body part which is connected with the penetrating part, and wherein an axial clearance exists between the main body part and the piston.

3. The valve assembly according to claim 2, wherein the connection between the main body part and the penetrating part is a stepped structure.

4. The valve assembly according to claim 2, wherein the valve assembly further comprises a limiting block configured to limit the stroke of the valve stem to keep the axial clearance.

5. The valve assembly according to claim 2, wherein the main body part is arranged between the bonnet and the piston, and wherein the main body part has an outer diameter greater than an outer diameter of the penetrating part.

6. The valve assembly according to claim 1, wherein the valve stem further comprises a main body part which is connected with the penetrating part, and wherein an outer diameter of the main body part is equal to an outer diameter of the penetrating part.

7. The valve assembly according to claim 1, further comprising a main spring arranged above the sensing device, wherein the force of the main spring is transferred to the valve stem through the sensing device.

8. The valve assembly according to claim 1, wherein the bonnet has a first end seated against the shell and a second end disposed in the valve body, the second end defined by the annular protrusion.

9. The valve assembly according to claim 1, wherein the bonnet is a unitary structure that is coupled to the valve body via a plurality of fasteners.

10. The valve assembly according to claim 1, wherein the bonnet is directly coupled to the shell via a plurality of fasteners.

11. The valve assembly of claim 1, wherein the inner radial surface has a diameter that is larger than a diameter of the inner surface of the cylindrical sleeve.

12. The valve assembly of claim 1, wherein the inner surface of the cylindrical sleeve has a diameter that is larger than an outer diameter of the piston.

13. A valve assembly, comprising:
a sensing device;
a valve body defining an inlet and an outlet, and including a valve port;
a bonnet coupled to the sensing device and the valve body, the bonnet partially disposed within the valve body;
a piston movably disposed within the valve body, the piston comprising a baffle and an annular portion extending outward from the baffle, the baffle including a center through hole, and the annular portion arranged to engage the valve port when the valve assembly is in a closed position;
a cylindrical sleeve having an inner surface arranged to sealingly engage the piston, the bonnet seated against a portion of the cylindrical sleeve;
a valve stem having an upper end connected with the sensing device and a lower end provided with a penetrating part which penetrates through the center through hole so as to enable the valve stem to be connected with the piston, wherein the sensing device drives the valve stem to drive the piston to move up and down; and
an auxiliary spring arranged on the piston, wherein the auxiliary spring is always in a compressed state,
wherein the length of the penetrating part is greater than the depth of the center through hole, and wherein the valve stem is slidably coupled in the center through hole of the piston, and
wherein the valve body defines a first shoulder and the cylindrical sleeve defines a second shoulder, the bonnet has an annular protrusion that extends into the valve body, and the annular protrusion has an outer radial surface that engages the valve body, an inner radial surface that engages the cylindrical sleeve, and an end surface extending between the outer and inner radial surfaces and seated against both of the first and second shoulders.

14. The valve assembly according to claim 13, wherein the valve stem further comprises a main body part which is connected with the penetrating part, and wherein an axial clearance exists between the main body part and the piston.

15. The valve assembly according to claim 14, wherein the connection between the main body part and the penetrating part is a stepped structure.

16. The valve assembly according to claim 14, wherein the valve assembly further comprises a limiting block configured to limit the stroke of the valve stem to keep the axial clearance.

17. The valve assembly according to claim 14, wherein the main body part is arranged between the bonnet and the piston, and wherein the main body part has an outer diameter greater than an outer diameter of the penetrating part.

18. The valve assembly according to claim 13, wherein the valve stem further comprises a main body part which is connected with the penetrating part, and wherein the outer diameter of the main body part is equal to the outer diameter of the penetrating part.

19. The valve assembly according to claim 13, further comprising a main spring arranged above the sensing device, wherein the force of the main spring is transferred to the valve stem through the sensing device.

20. The valve assembly according to claim 13, wherein the auxiliary spring is arranged between the bonnet and the baffle of the piston.

* * * * *

UNITED STATES PATENT AND TRADEMARK OFFICE
CERTIFICATE OF CORRECTION

PATENT NO. : 9,903,501 B2
APPLICATION NO. : 14/437829
DATED : February 27, 2018
INVENTOR(S) : Yuxiong Huo et al.

Page 1 of 1

It is certified that error appears in the above-identified patent and that said Letters Patent is hereby corrected as shown below:

In the Specification

At Column 1, Line 44, "not to work" should be -- not work --.

At Column 5, Line 23, "penetrating part 261 and the center through hole 242" should be -- penetrating part 461 and the center through hole 442 --.

At Column 5, Line 25, "main body part 262" should be -- main body part 462 --.

At Column 5, Line 26, "penetrating part 442," should be -- penetrating part 461, --.

At Column 5, Line 28, "piston 240" should be -- piston 440 --.

At Column 5, Line 29, "valve stem 260." should be -- valve stem 460. --.

At Column 5, Line 30, "valve stem 260" should be -- valve stem 460 --.

At Column 5, Line 31, "piston 240" should be -- piston 440 --.

Signed and Sealed this
Fourth Day of June, 2019

Andrei Iancu
*Director of the United States Patent and Trademark Office*